US010920860B2

(12) United States Patent
Stadermann et al.

(10) Patent No.: US 10,920,860 B2
(45) Date of Patent: Feb. 16, 2021

(54) BELT TENSIONING DEVICE

(71) Applicant: Muhr und Bender KG, Attendorn (DE)

(72) Inventors: Florian Stadermann, Attendorn (DE); Joachim Jud, Daaden (DE); Simon Pfeifer, Plettenberg (DE); Manfred Jung, Westerburg (DE)

(73) Assignee: Muhr und Bender KG, Attendorn (DE)

( * ) Notice: Subject to any disclaimer, the term of this patent is extended or adjusted under 35 U.S.C. 154(b) by 287 days.

(21) Appl. No.: 16/031,001

(22) Filed: Jul. 10, 2018

(65) Prior Publication Data

US 2019/0017579 A1   Jan. 17, 2019

(30) Foreign Application Priority Data

Jul. 17, 2017   (DE) .................. 10 2017 116 000

(51) Int. Cl.
*F16H 7/12*      (2006.01)
*F16H 7/08*      (2006.01)

(52) U.S. Cl.
CPC ............. *F16H 7/1281* (2013.01); *F16H 7/12* (2013.01); *F16H 7/1218* (2013.01);
(Continued)

(58) Field of Classification Search
CPC ........... F16H 2007/0874; F16H 7/1281; F16H 2007/0806; F16H 2007/081; F02B 67/06
(Continued)

(56) References Cited

U.S. PATENT DOCUMENTS 6,648,783 B1 * 11/2003 Bogner ................. F16H 7/1281
474/134
8,821,328 B2 *  9/2014 Jud ....................... F16H 7/1281
474/134
(Continued)

FOREIGN PATENT DOCUMENTS

DE      102011084680 B3   11/2012
DE   10 2011 082 330 A1    2/2013
(Continued)

*Primary Examiner* — Henry Y Liu
(74) *Attorney, Agent, or Firm* — Bejin Bieneman, PLC

(57) ABSTRACT

A belt tensioning device comprises: a base member; a first tensioning arm, which is pivotably supported by a bearing sleeve on the base member around a first pivot axis and which comprises a first tensioning roller, wherein the bearing sleeve is configured radially elastically and is connected to one of the components, the base member and the first tensioning arm in a rotationally fixed manner, and which is rotatable relative to the other of the components, the base member and the tensioning arm a second tensioning arm, which is pivotably supported on the base member around a second pivot axis and comprises a second tensioning roller; a spring arrangement that pre-tensions the first tensioning arm and the second tensioning arm in circumferential direction relative to each other; pre-tensioning means, which that are arranged radially between a circumferential face of the bearing sleeve and a circumferential face of the component connected to the bearing sleeve to exert a radial force in direction relative to the component rotatable thereto.

14 Claims, 4 Drawing Sheets

(52) U.S. Cl.
CPC ............... *F16H 2007/081* (2013.01); *F16H 2007/0806* (2013.01); *F16H 2007/0865* (2013.01); *F16H 2007/0874* (2013.01); *F16H 2007/0893* (2013.01); *F16H 2007/0897* (2013.01)

(58) Field of Classification Search
USPC ........................................................ 474/134
See application file for complete search history.

(56) References Cited

U.S. PATENT DOCUMENTS

| | | | | |
|---|---|---|---|---|
| 2002/0177499 A1* | 11/2002 | Ayukawa | ............... | F16H 7/1218 474/135 |
| 2012/0010034 A1* | 1/2012 | Gilmer | ............... | F16F 7/06 474/135 |
| 2013/0040770 A1* | 2/2013 | Wolf | ............... | F16H 7/1281 474/134 |
| 2013/0095966 A1* | 4/2013 | Staley | ............... | F16H 7/1218 474/135 |
| 2013/0095967 A1* | 4/2013 | Wolf | ............... | F16H 7/1281 474/135 |
| 2013/0203535 A1* | 8/2013 | Mack | ............... | F02B 67/06 474/134 |
| 2014/0315673 A1* | 10/2014 | Zacker | ............... | F16H 7/12 474/135 |
| 2015/0285317 A1* | 10/2015 | Lannutti | ............... | F16D 41/061 192/41 R |
| 2015/0300462 A1* | 10/2015 | Serkh | ............... | F16H 7/1281 474/112 |
| 2015/0308545 A1* | 10/2015 | Harvey | ............... | F02B 67/06 474/117 |
| 2015/0345597 A1* | 12/2015 | Walter | ............... | F02B 67/06 474/134 |
| 2015/0369347 A1* | 12/2015 | Wolf | ............... | F16H 7/1281 474/134 |
| 2016/0146312 A1* | 5/2016 | Pfeifer | ............... | F16H 7/08 474/135 |
| 2017/0146100 A1* | 5/2017 | Walter | ............... | F02B 67/06 |
| 2018/0010670 A1* | 1/2018 | Leucht | ............... | F02B 67/06 |
| 2018/0019638 A1* | 1/2018 | Ben-Omrane | ............... | H02K 7/083 |
| 2018/0038457 A1* | 2/2018 | Basile | ............... | F16H 7/1281 |
| 2018/0156317 A1* | 6/2018 | Maricic | ............... | F16H 7/1218 |
| 2018/0172117 A1* | 6/2018 | Arneth | ............... | F16H 7/1281 |
| 2018/0202521 A1* | 7/2018 | Reuschel | ............... | F16H 7/1218 |
| 2018/0320765 A1* | 11/2018 | Hauck | ............... | F16H 7/1218 |
| 2019/0242462 A1* | 8/2019 | Willis | ............... | F16H 7/12 |
| 2019/0285147 A1* | 9/2019 | Singh | ............... | F16H 7/1218 |

FOREIGN PATENT DOCUMENTS

| | | |
|---|---|---|
| DE | 102015222203 A1 | 5/2017 |
| EP | 2128489 A2 | 12/2009 |
| EP | 2778472 A1 | 9/2014 |
| EP | 3023670 A1 | 5/2016 |
| WO | 2014100894 A1 | 7/2014 |

\* cited by examiner

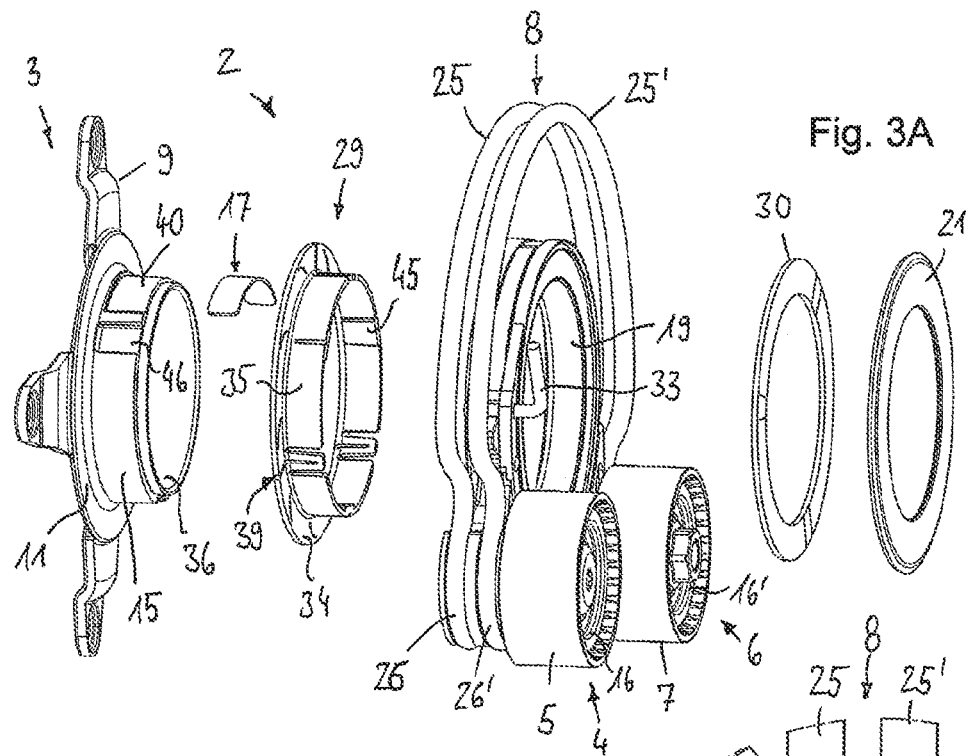
Fig. 3A
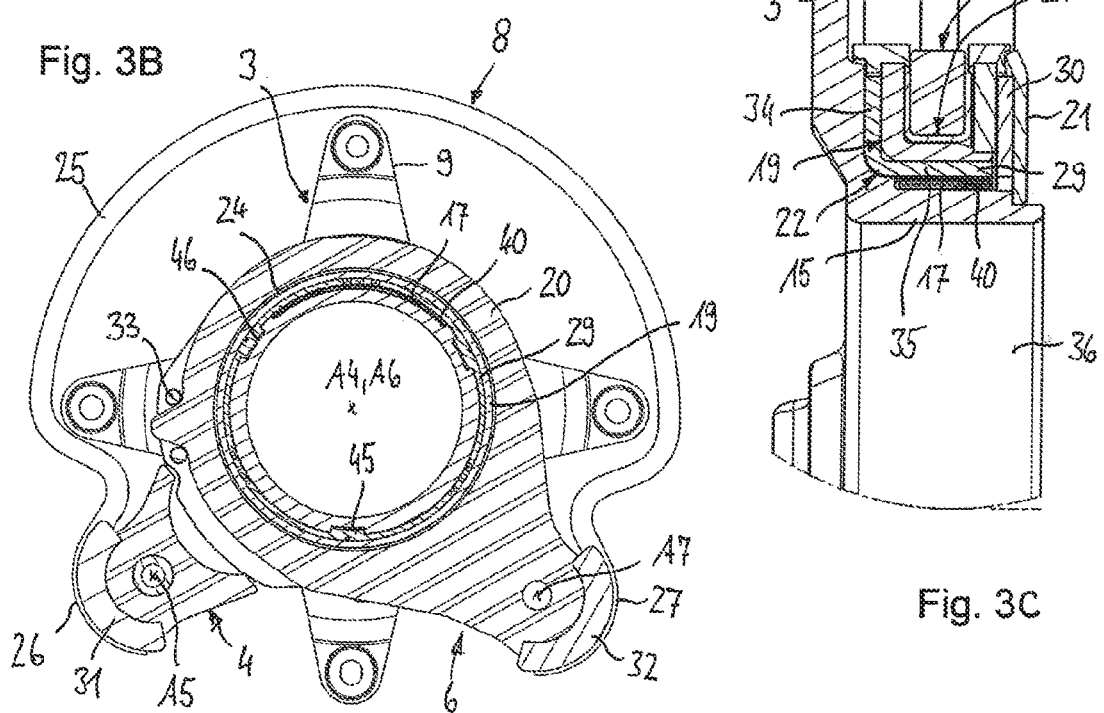
Fig. 3B
Fig. 3C

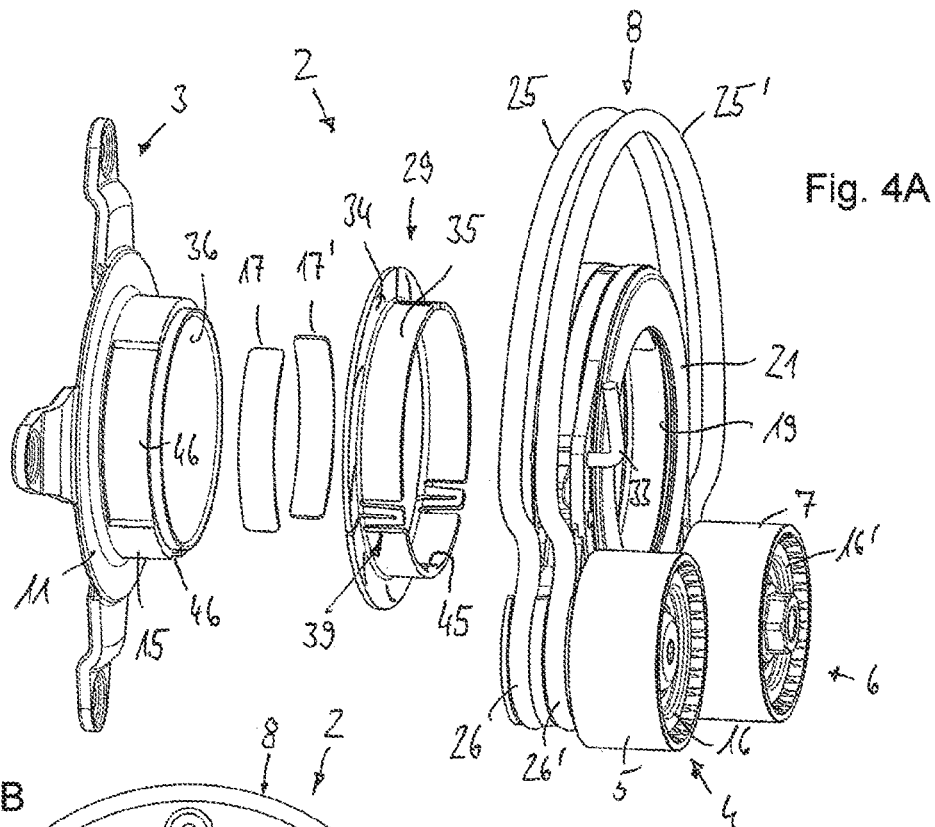
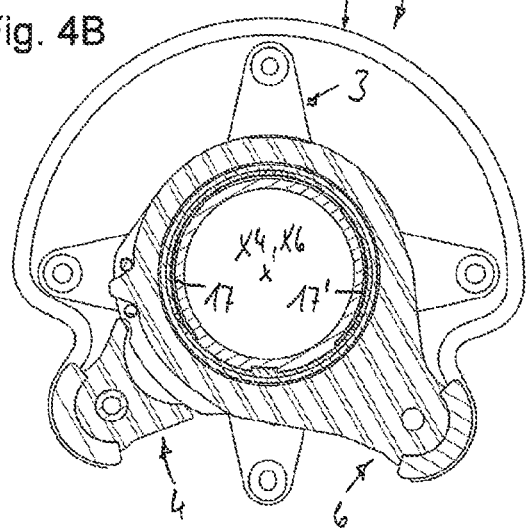
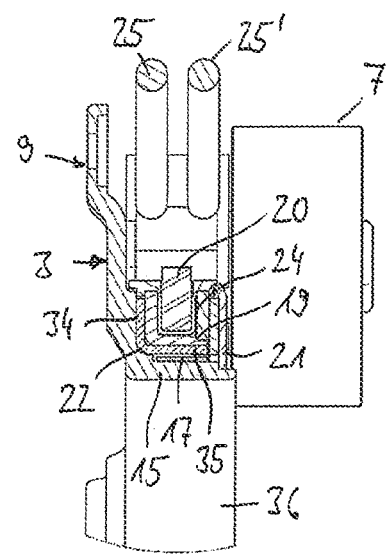
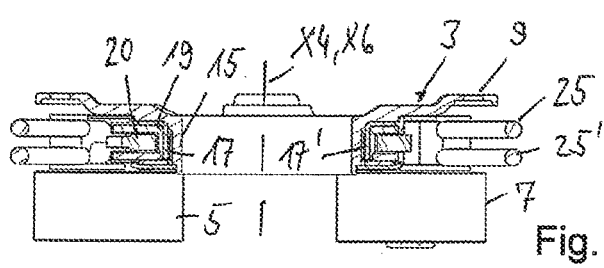

BELT TENSIONING DEVICE

CROSS-REFERENCE TO RELATED APPLICATIONS

This application claims priority to German Application No. DE 10 2017 116 000.0, filed on Jul. 17, 2017, which application is hereby incorporated herein by reference in its entirety.

BACKGROUND

A belt drive usually comprises an endless belt (i.e., a belt formed as a loop) and at least two belt pulleys, of which one functions as drive and one as output of the belt drive. Such belt drives are especially used on combustion engines of a motor vehicle for driving auxiliary units, wherein a first belt pulley is connected to the crank shaft of the combustion engine and drives the belt. Further belt pulleys are assigned to the auxiliary units, like for example a water pump, alternator, or air-conditioning compressor, and are rotatingly driven by the belt drive. In common belt drives, the auxiliary units are configured as consumers, i.e. they are driven by the belt pulley of the crankshaft via the belt. In this case, an undriven portion (i.e., a slack side where slack is formed) of the belt is formed between the crankshaft and the unit adjoining the crankshaft in a circumferential direction of the belt, said adjoining unit typically being a generator. To ensure a sufficient wrap of the belt around the belt pulley, the belt is pretensioned by a tensioning roller of the belt tensioning device.

From EP 2 128 489 A2 a belt tensioning device for a belt drive with a starter-generator is known. The belt tensioning device has a housing, in which two tensioning arms are pivotably supported around a pivot axis. The tensioning arms are supported against each other by spring means. The housing is attachable, when the drive belt pulley is mounted on the starter-generator, such that the housing is free of contact relative to the starter-generator in an annular area enclosing the drive shaft of the starter-generator.

From EP 2 778 472 A1 a similar belt tensioning device with two tensioning arms is known that are supported on each other via a spring in a circumferential direction. The spring has a number of at least 1.25 and at most 2.5 windings. Thus a short axial design is achieved.

From WO 2014/100894 A1 a belt tensioning device is known comprising a base member, a first tensioning arm rotatably supported thereon, as well as a second tensioning arm pivotably supported on the first tensioning arm. A dampening structure is provided to dampen the first tensioning arm relative to the base member. In one embodiment, the dampening structure comprises a disc spring that is arranged between the first tensioning arm and the base member with an axial pre-tensioning. In another embodiment a first and a second annular sleeve is provided that are axially pre-tensioned, to dampen a rotational movement of the first tensioning arm relative to the housing.

SUMMARY

Disclosed herein is a belt tensioning device for a belt drive comprising a belt-driven starter-generator. The belt tensioning device has low positional tolerances and good dampening characteristics.

A belt tensioning device comprises a base member with a sleeve projection; a first tensioning arm, which is pivotably supported by a bearing sleeve on the sleeve projection of the base member around a first pivot axis and has a first tensioning roller that is rotatable around a first axis of rotation, wherein the bearing sleeve is designed to be radially elastic and is connected in a rotationally fixed manner to one of the components base member and first tensioning arm, and is rotatable relative to the other one of the components base member and first tensioning arm; a second tensioning arm that is pivotably supported on the base member around a second pivot axis and has a second tensioning roller rotatable around a second axis of rotation; a spring arrangement that is arranged between the first tensioning arm and the second tensioning arm such the first tensioning arm and the second tensioning arm are pre-tensioned relative to each other in a circumferential direction by the spring arrangement; pre-tensioning means that are arranged radially between a circumferential face of the bearing sleeve and a circumferential face of the component connected to the bearing sleeve in a rotationally fixed manner, to provide a radial force in direction to the component rotatable relative thereto.

An advantage of this belt tensioning device is that the radially acting pre-tensioning means have no negative influence on the bearing and the guiding of the tensioning arms, pivotably supported on the base member. The arrangement between the base member, the bearing sleeve and the tensioning arm pivotably supported thereon, is free of radial play because of the radial pre-tensioning force. Overall, in this manner good damping characteristics can be achieved with at the same time low positional tolerances for the tensioning arms. By a suitable selection and design of the pre-tensioning means, the required dampening characteristics of the belt tensioning device can be adapted as required, in particular concerning the characteristics required during the starting, boosting, or recuperation operation.

The structure and the operating principle are generally such that the three components, i.e. the base member, the bearing sleeve and the tensioning arm are arranged coaxially within each other, wherein the bearing sleeve is rotationally fixed to one of the two components, i.e., the base member or the tensioning arm, and is rotatable relative to the other of said components, i.e. the tensioning arm or the base member. The pre-tensioning means are arranged so as to be radially effective between the two components being rotationally fixed to each other and act radially on the radial-elastic bearing sleeve in direction toward the component rotatable relative thereto.

The bearing sleeve can have a plurality of slots and/or meandering web portions, distributed along the circumference and extending in an axial direction. The slots and/or meandering web portions, distributed along the circumference, allow the bearing sleeve to be radially expanded or contracted. By means of the radial-elastic deformability, the radial forces, introduced by the pre-tensioning means are transferred in a radial direction, to the component rotatable thereto, so that a play-free support is provided between the tensioning arm and the base member.

The bearing sleeve can be a plastics component, for example, a plastics component made from polyamide. The bearing sleeve can be coated with a friction reducing coating, for example from Polytetrafluoroethylen (PTFE).

The base member can be made for example from a metal material, such as a light metal casting component or in the form of a sheet metal forming component from a steel sheet, wherein manufacture from plastics, in particular fibre reinforced plastics, is also possible.

The first and/or second tensioning arm can be manufactured from a metal material, in particular a steel material or a light metal cast.

The pre-tensioning means can in principle have any shape. All elements that can generate a radially effective pre-tensioning force onto the bearing sleeve are possible. According to a possible embodiment, the pre-tensioning means comprise at least one spring element extending in a circumferential direction between the bearing sleeve and the component thereto in a rotationally fixed way. The circumferential extension of a spring element can be, for example at least 10° and/or at most 30° around the pivot axis.

The dampening force can be designed according to the requirements by appropriately selecting the number, the strength, and/or the arrangement of the spring elements. If a larger dampening is required, two or more spring elements can be distributed along or over the circumference. In this case, the spring elements can be arranged such that the radial forces generated by the spring elements at least partially cancel each other out. An advantageous compromise with regard to production and assembly efforts on the one hand and good radial pre-tensioning on the other hand, is the use of two spring elements that are preferably arranged at least approximately diametrically opposite to each other, for example around 180°±10°. When using a plurality of spring elements, these are preferably equally designed, respectively are identical amongst each other. The spring elements can be for example in the form of leaf springs or wave springs, wherein in principle also other elastic elements like rubber elements can be taken into account.

In a non-assembled condition the at least one spring element can have a curvature that deviates from the curvature of the support face of the bearing sleeve and/or of the component (tensioning arm or base member) non-rotatably connected thereto. According to a first possibility, the spring element can have a larger curvature than the support face, wherein in particular also a straight design is included. Alternatively thereto, the spring element can also have a smaller curvature than the support face. By means of the curvature deviating from that of the support face, a radial force is effected from the spring element onto the bearing sleeve that is designed to be radially and circumferentially elastic. The bearing sleeve is thus radially elastically expanded and radially loads the component rotatable thereto (tensioning arm or base member) and thus acts like a brake.

For a preferably high and constant damping force it is advantageous, if the pre-tensioning means have a preferably large contact surface. For this, the pre-tensioning means can have an axial length that corresponds at least to half the axial length of the bearing sleeve.

As described above, the bearing sleeve is connected in a rotationally fixed manner to one of the components, i.e. base member or tensioning arm. For a rotationally fixed connection, form-fitting means can be provided between the bearing sleeve and the component connected thereto that engage each other form-fittingly. The form-fitting means can comprise for example a web extending in axial direction that form-fittingly engages in a corresponding groove extending in axial direction, so that the bearing sleeve is rotationally fixed, i.e., secured against rotation relative to the connecting component.

In order to reliably hold the at least one spring element, a recess can be provided for each spring element in the circumferential face of the component connected to the bearing sleeve in a rotationally fixed manner, in which recess a respective spring element is accommodated. In this case, it can be provided in particular that the spring elements are supported in circumferential direction on side faces of the recess. According to a possible first embodiment the bearing sleeve is connected to the base member in a rotationally fixed manner, and the first tensioning arm is rotatable relative to the bearing sleeve. In this case, the at least one spring element is radially supported on the base member and loads the bearing sleeve in a direction towards the bearing ring of the tensioning arm. According to an alternative second embodiment the bearing sleeve is connected to the tensioning arm in a rotationally fixed manner, and the unit including the bearing ring and the tensioning arm is rotatable relative to the base member. In this case, the at least one spring element is radially supported on the tensioning arm and loads the bearing sleeve in direction towards the sleeve projection of the base member.

According to an embodiment the spring arrangement includes at least one bow-shaped spring that in the assembled condition has a circumferential extension around the pivot axes of the tensioning arms of less than 360°, e.g., less than 330°. The bow-shaped spring has comprises respective support portions at its ends, by which the spring is supported on the respective tensioning arm in a circumferential direction to load the two tensioning arms towards each other. The support portions of the spring can be formed to be arch-like and can rest in a corresponding circumferential groove at the respective tensioning arm, so that the spring is fixed in an axial direction and in a circumferential direction by accommodation in the two circumferential grooves of the two tensioning arms. A spring portion is arranged between the two support portions in which spring portion potential energy is stored, when the spring is elastically expanded. The spring portion, which can also be designated as a bow-portion, can be subjected to bending loads upon elastic expansion. The at least one bow-shaped spring can be produced from round wire or rectangular wire. Two or more springs can be provided.

The base member can have an attachment portion for attaching the belt tensioning device on a stationary component, for example the unit or the engine housing. The attachment portion can project flange-like from the sleeve portion or annular portion, through which the drive shaft extends. It is advantageous that the attachment portion has a plurality of attachment points, at which the base member can be connected to the unit.

SUMMARY OF THE DRAWINGS

Example embodiments are described in the following using the drawings, which show:

FIG. 3A: a belt tensioning device in a third embodiment with two bendable springs in a perspective exploded view;

FIG. 3B: a belt tensioning device in the third embodiment with two bendable springs in a cross-sectional view through a section plane between the bendable springs;

FIG. 3C: a belt tensioning device in the third embodiment with two bendable springs in a longitudinal sectional view;

FIG. 4A: a belt tensioning device in a modified second embodiment with one bendable spring in a perspective exploded view;

FIG. 4B: a belt tensioning device in the modified second embodiment with one bendable spring in a cross-sectional view through a section plane between the bendable springs;

FIG. 4C: a belt tensioning device in a modified second embodiment with one bendable spring in a half longitudinal sectional view;

FIG. 4D: a belt tensioning device in a modified second embodiment with one bendable spring in a half longitudinal sectional view in an enlarged representation.

DETAILED DESCRIPTION

Figure 1A:
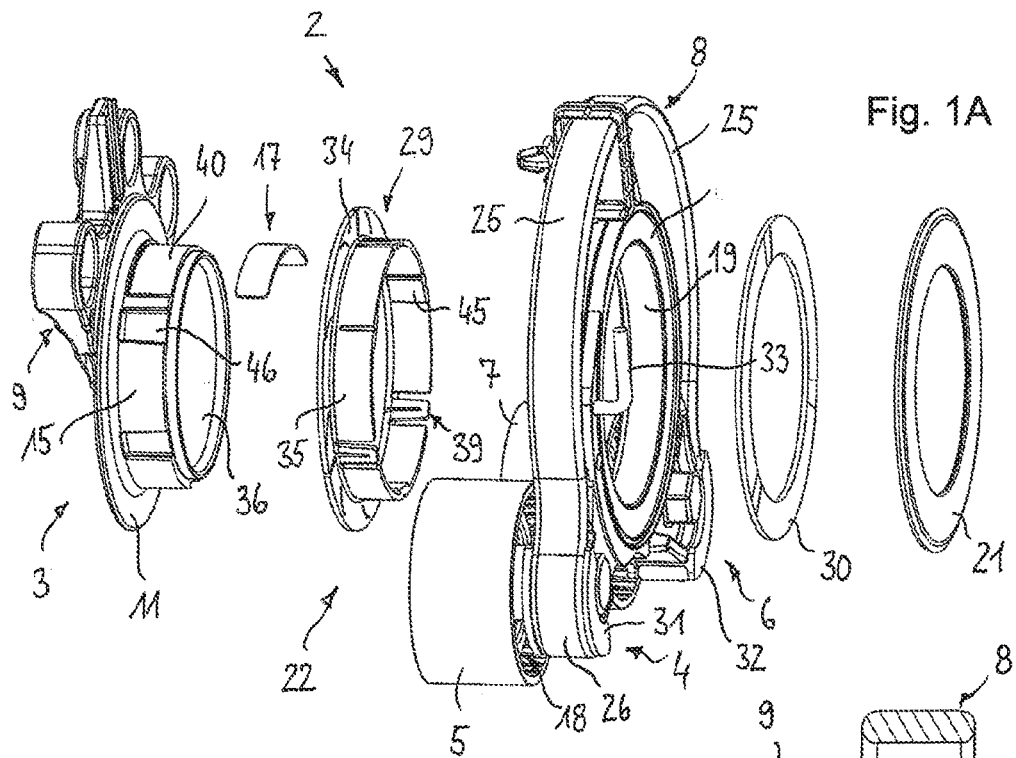
FIG. 1A: a belt tensioning device in a first embodiment with a bendable spring in a perspective exploded view.

FIGS. 1A to 10, which are described together below, show a belt tensioning device 2 according to a first embodiment. The belt tensioning device 2 comprises a base member 3, a first tensioning arm 4 with a first tensioning roller 5, a second tensioning arm 6 with a second tensioning roller 7, and a spring arrangement 8, via which the two tensioning arms 4, 6 are elastically supported against each other in a rotational direction.

The base member 3 can be fixed to a stationary component like a device having multiple parts, i.e., an aggregate, i.e. a unit. The aggregate can in principle be any machine that is part of the belt drive, e.g., any auxiliary unit like a generator, water pump or the same, driven by the main engine of a motor vehicle. For connecting to the stationary component the base member 3 has an attachment portion 9, having, e.g., three flange projections 10 with bores distributed across the circumference and projecting radially outwardly, through which bores screws can be passed for attaching to the stationary component. The belt tensioning device 2 according to the present embodiment is formed such that the attachment portion 9 of base member 3 and the tensioning rollers 5, 7 are arranged on a same side in relation to the bearing 22, 23, 24 of the tensioning arms 4, 6.

Furthermore, the base member 3 has a flange portion 11 which radially inwardly adjoins the attachment portion 9 and which serves for the axial support of the second tensioning arm 6. The flange portion 11 merges radially inwardly into a sleeve portion 15, on which the first and, respectively, second tensioning arm 4, 6 is radially supported. On the free end of the sleeve portion 15 an annular disc 21 is fixed as end portion. In the present embodiment this is carried out by beading, i.e. flattening down an end-sided edge of the sleeve portion 15, wherein other attachment methods are also possible. The annular disc 21 forms a support face for axially supporting the first and second tensioning arm 4, 6, respectively. Altogether the annular disc 21, the sleeve portion 15 and the flange portion 11 form a receptacle, which is approximately C-shaped when seen in a half longitudinal sectional view, for the two tensioning arms 4, 6.

The base member 3, the first tensioning arm 4 and the second tensioning arm 6 are in the present example made from a metal material, like cast light metal or steel. Steel components have the advantage of a high strength at low material consumption, so that in particular the tensioning arms 4, 6 can be formed axially flat. The axial length of the two tensioning arms 4, 6 is shorter in the area of the bearing than the axial length of the spring arrangement 8.

The first tensioning arm 4 is pivotably supported by the first bearing 22 around a first pivot axis A4. The second tensioning arm 6 is pivotably supported by the second bearing 24 around a second pivot axis A6. Here, the two bearings 22, 24 are arranged coaxially to each other, i.e., the two pivot axes A4, A6 coincide. However, it is also possible for specific applications that the two pivot axes can be arranged parallel or eccentrically to each other. The spring arrangement 8, extending in a circumferential direction around the pivot axes A4, A6, counteracts a relative pivot movement of the two tensioning arms 4, 6. The two tensioning arms 4, 6 are pivotable relative to each other in a limited manner due to the interconnected spring arrangement 8, and are freely rotatable together with the spring arrangement 9 relative to the base member around the axes A4, A6, i.e. over 360° and more. In the condition of being mounted to the stationary component, this free rotatability is only provided as far as the mounting position allows. It is provided that the pivot axes 4, 6 are arranged within an opening 36 of the base member 3 in the mounted condition of the belt tensioning device 2.

The tensioning arms 4, 6 have respectively a support portion 12, 13 which projects from an annular bearing portion 19, 20 of the respective tensioning arm 4, 6 radially outwardly. On the support portion 12, 13, respectively, an associated tensioning roller 5, 7 is mounted and is supported by means of corresponding bearings 18, 18' so as to be rotatable around the axes of rotation A5, A7 extending parallel to the pivot axes A4, A6. The bearing 18 is fixed to the support portion by means of a screw 14. The second tensioning roller 7 is pivotably supported in an analogous manner on a bearing element of the second tensioning arm 6 and is attached to the tensioning arm 6 by means of a screw connection 14'. Discs 16, 16' prevent the penetration of dirt into the bearings 18, 18' of the tensioning rollers 5, 7.

In the following, the bearing arrangement of the belt tensioning device is described in more detail, which is visible as a detail especially in FIG. 10. The first tensioning arm 4 has radially inwardly, a bearing portion 19 for being rotatably supported on the base member 3. The second tensioning arm 5 has a bearing portion 20 for being rotatably supported relative to the first bearing portion 19 and to the base member 3, respectively. One can see that the first bearing portion 19 and the second bearing portion 20 are supported axially and radially against each other. The first bearing portion is, when seen in a half longitudinal sectional view, approximately C-shaped and is rotatably supported by the first bearing 22 on the base member 3. The second bearing portion 20 is formed, when seen in a sectional view, approximately rectangular and rests rotatably in the C-shaped first bearing portion 19.

The first bearing 22 comprises a bearing sleeve 29 which is approximately L-shaped in a cross-sectional view and which forms an axial and radial support for the first tensioning arm 4 relative to the base member 3, as well as a bearing disc 30 connected to the bearing sleeve 29 which disc slidingly supports the first tensioning arm 4 in opposite second axial direction. The L-shaped bearing sleeve 29 and the bearing disc 30 together form an approximately C-shaped bearing receptacle chamber, in which the bearing portions 19, 20 of the tensioning arms 4, 6 are received. The first bearing 22 is axially supported against the annular disc 21 that is rigidly connected to the sleeve portion 15. The bearing sleeve 29 rests on the sleeve portion 15 of the base member 3 and forms a radial bearing for the C-shaped annular portion 19 of the first tensioning arm 4. The second bearing portion 20 is axially and radially supported in the C-shaped first bearing portion 19 via a second bearing 24 that is formed in e.g., a C-shaped sliding ring.

The assembly can be carried out such that the bearing arrangement includes the second bearing 24, the second tensioning arm 6, the axial bearing 23, the first tensioning arm 4 and the first bearing 22, is pushed onto the sleeve portion 15. Then the annular disc 21 is pushed onto the sleeve portion 15 and then the end-sided collar of the sleeve portion 15 is beaded down. In the mounted condition, the tensioning arms 4, 6 are arranged axially between the attachment portion 11 and the annular disc 21. The axial length of the base member 3 and/or of the sleeve portion 15 is smaller than three-times the axial length of the bending spring 25, so that the axial design space is particularly small. Between the components 3, 4, 6 which are rotatable relative to each other, annular seals 41, 42 are provided that prevent an unwanted penetration of dirt into the bearings.

A speciality of the present embodiment is that pre-tensioning means 17 are provided that are arranged radially between an outer circumferential face of the base member 3 and the inner circumferential face of the bearing sleeve 29, to provide a radial force radially outwardly in direction to the annular portion 19 rotatably relative thereto. The bearing sleeve 29 is for example a plastics component, e.g., a plastics component made from Polyamide which can be coated with a friction reducing coating, for example made from Polytetrafluoroethylene (PTFE).

The bearing sleeve 29 is held non-rotatably, i.e. in a rotational fixed manner, relative to the sleeve portion 15 of the base member. For the rotational fixed connection, form-fitting means are provided that in the present example comprise a plurality of radial projections 45 on the inner circumferential face of the bearing sleeve 29, which can be inserted into corresponding recesses 46, respectively grooves, open at one end, so that the two components are form-fittingly connected to each other in a circumferential direction. The bearing sleeve 29 is formed to be approximately L-shaped in a sectional view and has a flange-like portion 34 that is supported axially on the flange portion 11 of the base member 3 and forms an axial friction bearing face for the bearing ring 19 of the first tensioning arm 4, and the bearing sleeve has a sleeve-like portion 35 that forms a circumferential sliding bearing face for the bearing ring 19.

It can be seen in particular in FIG. 1A that the bearing sleeve 29 has a plurality of circumferentially distributed slots and/or meandering web portions 39, extending in axial direction. The slots and/or meandering web portions 39 that are distributed along the circumference, enable the bearing sleeve 29 to be radially expanded. Because of the radially-elastic deformability, the radial forces introduced by the pre-tensioning means 17 are transferred radially outwardly to the bearing ring 19 of the first tensioning arm 4, so that a play-free support is provided between the tensioning arm 4 and the base member 3.

The pre-tensioning means 17 comprise in the present embodiment a spring element that extends in a circumferential direction between the sleeve portion 15 of the base member 3 and the bearing sleeve 29 connected thereto in a rotationally fixed manner. By an appropriate design of the spring element 17, especially size and strength, the damping force can be configured as required. A spring element 17 can for example extend along a circumferential extension of between 30° and 90° relative to the pivot axis A4. The axial length of a spring element 17 can be at least half the axial length of the bearing sleeve 29.

Although not shown in the drawings, in a non-assembled condition the spring element 17 has a curvature that deviates from the curvature of the support face of the base member 3. It is especially provided that the spring element is formed as a straight leaf spring. Due to the curvature deviating from that of the support face, a radial force is generated by the spring element 17 to the radially-elastic bearing sleeve 29 arranged coaxially thereto. The bearing sleeve 29 is thus radially elastically expanded and loads the annular bearing portion 19 of the first tensioning arm 4. Thus, in the interaction with the bearing sleeve 29, the pre-tensioning means 17 have a decelerating and/or damping effect on the tensioning arm 4. Therefore, the pre-tensioning means 17 and the bearing sleeve 29 together can also be referred to together as damping means.

It can be seen in particular in FIG. 1A that the spring element 17 rests in a recess 40 extending in a circumferential direction. The circumferential extension of the recess 40 corresponds to the circumferential extension of the spring element 17 in the inserted condition, so that the spring element 17 is securely held relative to the base member 3.

The spring arrangement 8 comprises a bow-shaped spring 25 that is supported with a first support portion 26 on the first tensioning arm 4 and with a second support portion 27 on the second tensioning arm in a circumferential direction. The support portions 26, 27 form the ends of the bow-shaped spring 25 and thus can also be referred to as end portions. The end portions are formed to be arch-shaped and engage in corresponding circumferential grooves of a respective support element 31, 32 connected to the associated tensioning arm 4, 6. The support elements 31, 32 are each pushed from below onto the associated support element 17 of the tensioning arm 4, 6. Because of the form-fitting engagement of the end portions 26, 27 in the associated support elements 31, 32, the bow-shaped spring 25 is fixed in an axial direction and in a circumferential direction. The free spring portion of the bow-shaped spring 25 extends between the two support portions 26, 27, in which spring portion a potential energy is stored when the spring is expanded. The bow-shaped spring 25 is formed mirror-symmetrically in relation to a center plane extending between the two end portions.

The bow-shaped spring 25 has a circumferential extension of less than 60° around the first and second pivot axis A4, A6. An average radius of the spring portion of the bow-shaped spring 25 is larger than a largest radius of the annular bearing portion 19, 20 of the two tensioning arms 4, 6. The axial total length of the bow-shaped spring 25 is larger than the annular bearing portions 19, 20 of the two tensioning arms 4, 6, so that a total axial compact design is achieved. In the present embodiment, the bow-shaped spring 25 is formed from a flat material. Flat material means for example that as a starting material a sheet metal strip with a rectangular cross-section is used.

In the assembled condition, the bow-shaped spring 25 is subjected to strong pressure pretension in circumferential direction, i.e. the spring is expanded relative to its relaxed condition, so that the spring acts on the two tensioning arms 4, 6 in a direction towards each other. For the (temporary) fixing of the pre-tensioned position, the tensioning arms 4, 6 are moved against the pre-tensioning force of the spring away from each other and a retaining pin 33 is inserted into a first bore in the first tensioning arm which pin is supported on a radial projection of the second tensioning arm 6 in a circumferential direction. After the mounting of the belt tensioning device 2 on a unit and applying the belt, the retaining pin 33 is pulled, so that the tensioning arms 4, 6 are loaded by the bow-shaped spring 25 in a circumferential direction towards each other and the tensioning rollers 5, 7 tension the belt.

The base member 3 and the belt tensioning device 2, respectively, are formed such that—in the mounted condition of the belt tensioning device 2 on a unit—the pivot axes A4, A6 of the tensioning arms 4, 6 are arranged within the outer diameter of the drive shaft, e.g., essentially coaxially to the rotational drive axis.

Figure 1B:
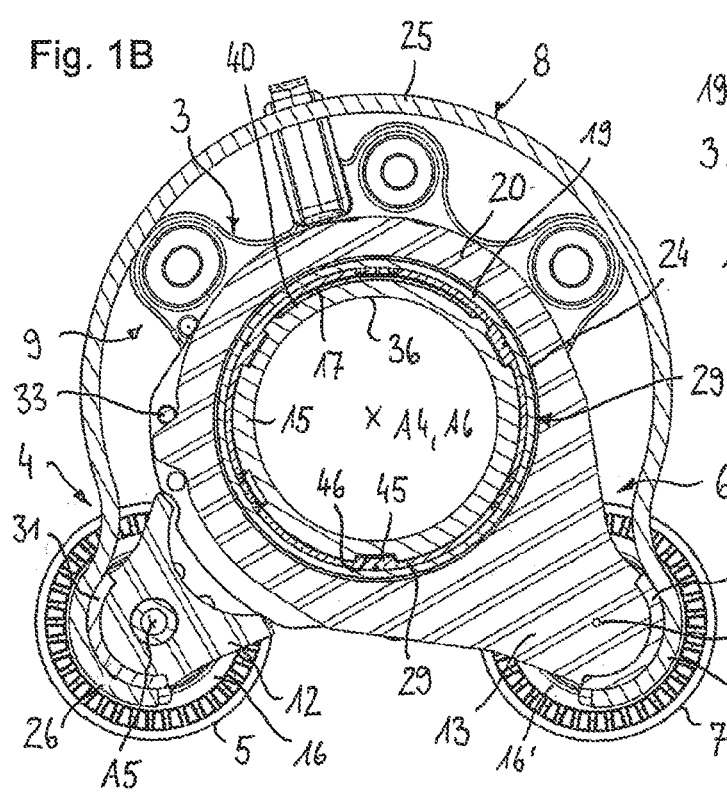
FIG. 1B: a belt tensioning device in the first embodiment with the bendable spring in a cross-sectional view.
Figure 1C:
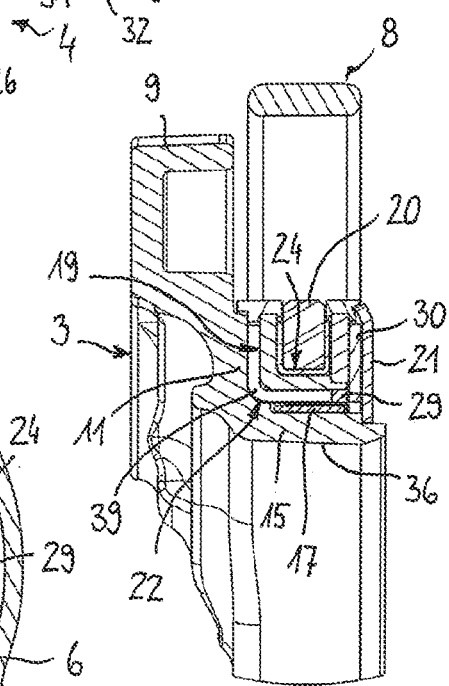
FIG. 1C: a belt tensioning device in the first embodiment with the bendable spring in half longitudinal sectional view.
Figure 2A:
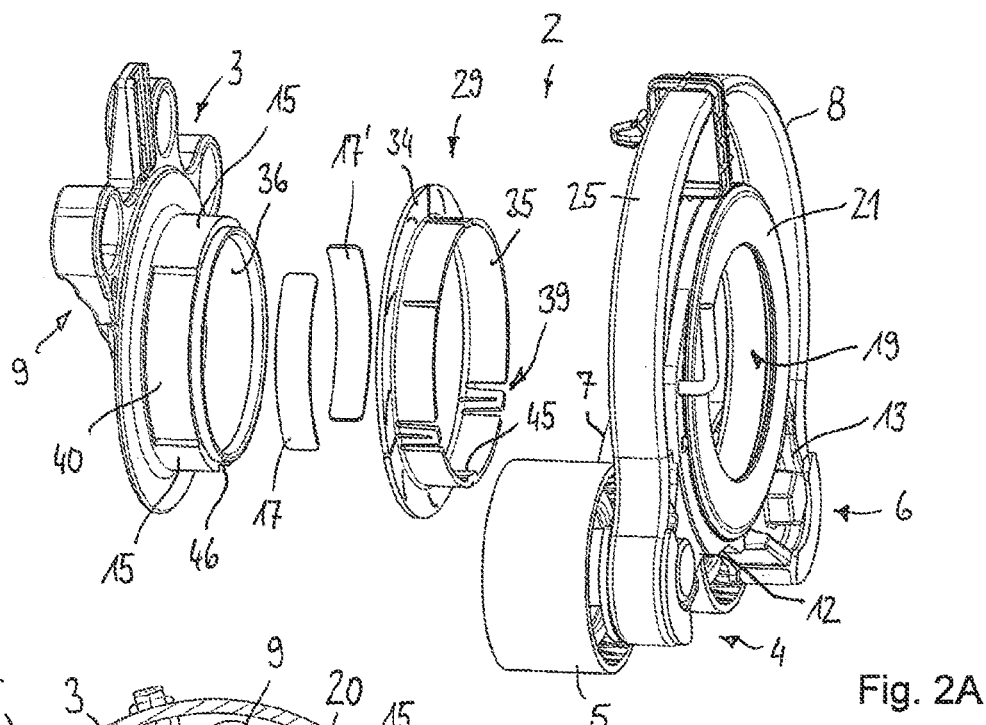
FIG. 2A: a belt tensioning device in a second embodiment with a bendable spring in a perspective exploded view.
Figure 2B:
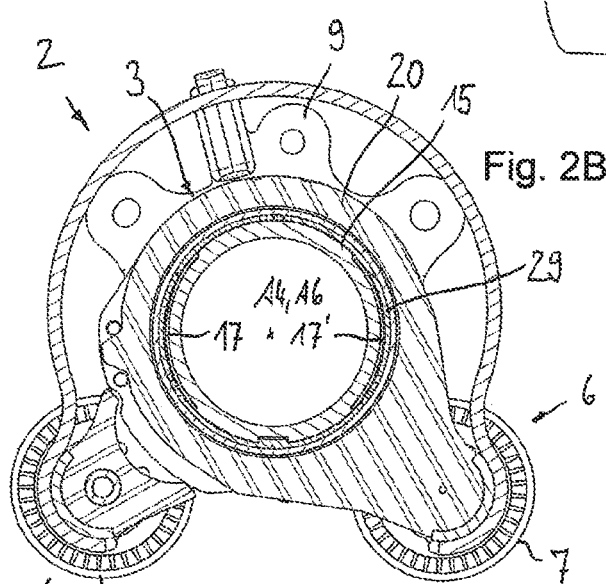
FIG. 2B: a belt tensioning device in the second embodiment with the bendable spring in a cross-sectional view.
Figure 2C:
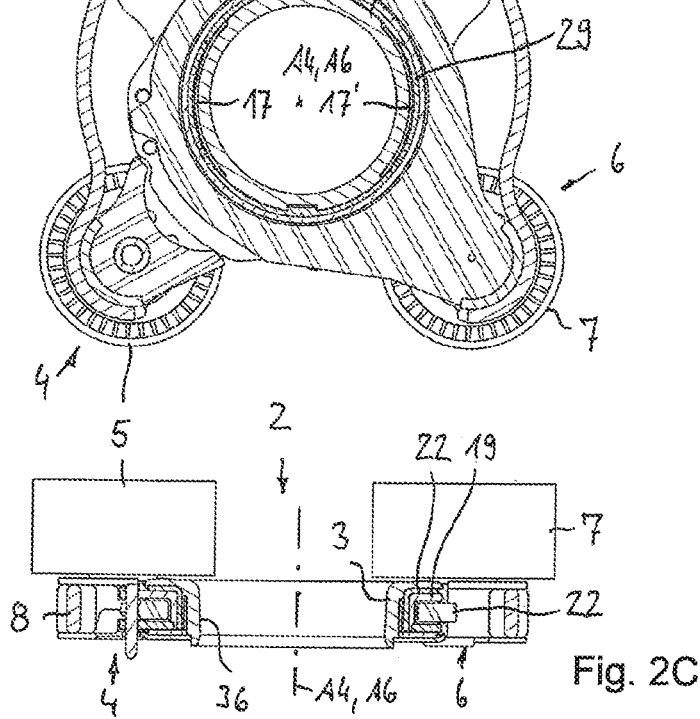
FIG. 2C: a belt tensioning device in the second embodiment with the bendable spring in a longitudinal sectional view.
Figure 2D:
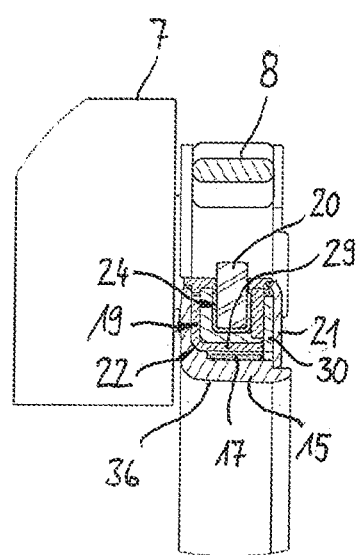
FIG. 2D: a belt tensioning device in the second embodiment with the bendable spring D in a half longitudinal sectional view in an enlarged representation.

In FIGS. 2A to 2D a slightly modified second embodiment of the belt tensioning device is shown that substantially corresponds to the belt tensioning device of FIG. 1, to which description it is referred concerning the common features. In this case, the same and/or corresponding details are provided with the same reference numerals as in FIG. 1.

Different from the embodiment of FIG. 1, the pre-tensioning means in the embodiment of FIG. 2 comprise two spring elements 17, 17' that are arranged diametrically opposite to each other. The two spring elements 17, 17' extend in the present case across a circumferential extension of approximately 90° around the pivot axis A4, without being limited thereto. An advantage of the present embodiment is that herewith larger radial forces can be generated, which leads to a larger dampening effect. As the spring elements 17, 17' are directed in opposite direction to each other, the forces act symmetrically on the bearing sleeve 29. In the exploded view shown in FIG. 2A, the bearing disc 30 and the finishing disc 21 are shown in the already assembled condition.

In FIGS. 3A to 3C, a belt tensioning device 2 is shown in a further embodiment. The present embodiment largely corresponds to the belt tensioning device of FIG. 1, to which description it is referred concerning the communalities. In this case, the same and, respectively, corresponding details are provided with the same reference numerals as in FIG. 1.

A first difference of the present embodiment is that the belt tensioning device 2 is formed such that the bearings 22, 24 of the tensioning arms 4, 6 are arranged on the base member 3 axially between the attachment portion 9 of the base member 3 and a center plane of the tensioning rollers 5, 7 or of the belt. The belt plane is defined as the plane that is formed by the belt center in the assembled condition.

A further difference concerns the design of the spring arrangement 8. The spring arrangement 8 comprises in the present embodiment two bow-shaped springs 25, 25' that are formed the same and are arranged parallel to each other. The two bow-shaped springs 25, 25' can be connected to each other by one or a plurality of attachment elements, thereby forming an axial gap therebetween. The end portions 26, 27; 26', 27' are accommodated in support elements 31, 32, which have respectively two arch-shaped grooves. The support elements 31, 32 are connected as in the embodiment of FIGS. 1 and 2 with the respective tensioning arm 4, 6. The two bow-shaped springs 25, 25' are in the present case made from a round material, i.e. they have a round cross-section along the length.

In the embodiment according to FIG. 3, the pre-tensioning means 17 comprise a spring element, extending in a circumferential direction between the sleeve portion 15 of the base member 3 and the bearing sleeve 29 connected thereto in a rotationally fixed manner, as in the embodiment of FIG. 1. Reference is made here to the above description concerning the design and the function of the pre-tensioning or the dampening to prevent repetition.

In FIGS. 4A to 4D a further embodiment of the belt tensioning device 2 is shown. This substantially corresponds to the belt tensioning device of FIGS. 3A-3C, to which description reference is hereby made concerning the commonalities. The same or corresponding details are provided with the same reference numerals as in FIG. 3.

Different from the embodiment of FIG. 3, the pre-tensioning means in the embodiment of FIG. 4 comprise two spring elements 17, 17' which are arranged diametrically opposite to each other. In the present embodiment the two spring elements 17, 17' extend along a circumferential extension of approximately 90° around the pivot axis A4, without being limited thereto. An advantage of the present embodiment is that larger radial forces can be provided therewith, which leads to a larger dampening effect. As the spring elements 17, 17' are directed opposite to each other, the forces act symmetrically on the bearing sleeve 29. In the exploded representation shown in FIG. 4A, the bearing disc 30 and the finishing disc 21 are shown in the already assembled condition.

For all the above described embodiments it is an advantage that the arrangement between the base member 3, the bearing sleeve 29 and the tensioning arm 4 supported pivotably thereon, is radially play-free due to the radial pre-tensioning force of the pre-tensioning means. Overall, in this manner good dampening characteristics are achieved with at the same time low positional tolerances for the tensioning arms 4, 6. By means of suitable selection and design of the pre-tensioning means, the required dampening characteristics of the belt tensioning device can be adapted as needed.

LIST OF REFERENCE NUMBERS 2 belt tensioning device
3 base member
4 first tensioning arm
5 first tensioning roller
6 second tensioning arm
7 second tensioning roller
8 spring arrangement
9 attachment portion
10 flange projection
11 flange portion
12 support portion
13 support portion
14 screw
15 sleeve portion
16 disc
17, 17' tensioning means
18 bearing
19 bearing portion
20 bearing portion
21 annular disc
22 bearing
23 bearing
24 bearing
25, 25' bow-shaped spring
26, 26' support portion
27, 27' support portion
28, 28' spring portion
29 bearing sleeve
30 bearing disc
31 support element
32 support element
33 bore
34 flange portion
35 sleeve portion
36 bore
39 web portion 40 recess
41 annular seal
42 annular seal
A axis

The invention claimed is:

1. A belt tensioning device, comprising:
   a base member having a sleeve projection;
   a first tensioning arm that is pivotably supported by a bearing sleeve on the sleeve projection of the base member around a first pivot axis and which comprises a first tensioning roller that is rotatable around a first axis of rotation, wherein the bearing sleeve is radially elastic, is connected to a first component in a rotationally fixed manner, and is rotatable relative to the other one of the base member and the tensioning arm, wherein the first component is one of the base member and first tensioning arm;
   a second tensioning arm that is pivotably supported on the base member around a second pivot axis and that comprises a second tensioning roller that is rotatable around a second axis of rotation;
   a spring arrangement that is arranged between the first tensioning arm and the second tensioning arm such that the first tensioning arm and the second tensioning arm are pre-tensioned relative to each other in a circumferential direction by the spring arrangement; and
   pre-tensioning means that are arranged radially between a circumferential face of the bearing sleeve and a circumferential face of the component connected to the bearing sleeve in a rotationally fixed manner to exert a radial force in a direction toward a second component rotatable relative thereto, wherein the second component is one of the base member and first tensioning arm.

2. The belt tensioning device of claim 1, wherein the pre-tensioning means comprise at least one spring element that extends in a circumferential direction between the bearing sleeve and the first component, wherein the spring element extends around a circumferential extension of at least 30°.

3. The belt tensioning device of claim 1, wherein the pre-tensioning means comprise at least one spring element that extends in a circumferential direction between the bearing sleeve and the first component, wherein the spring element extends around a circumferential extension of at most 90°.

4. The belt tensioning device of claim 1, wherein at least two spring elements are arranged around the circumference, wherein the spring elements are arranged such that radial forces generated by the spring elements cancel each other out at least partially.

5. The belt tensioning device of claim 4, wherein the spring elements are configured to exert forces equal to one another.

6. The belt tensioning device of claim 1, wherein in a non-mounted condition, the at least one spring element has a curvature that deviates from a curvature of the first component.

7. The belt tensioning device of claim 1, wherein the pre-tensioning means have an axial length that corresponds to at least half an axial length of the bearing sleeve.

8. The belt tensioning device of claim 1, wherein the circumferential face of the first component has a recess for each spring element, in which recess respectively one spring element is accommodated.

9. The belt tensioning device of claim 1, wherein the bearing sleeve is rotationally fixedly connected to the base member, and the first tensioning arm is rotatable relative to the bearing sleeve.

10. The belt tensioning device of claim 1, wherein the sleeve projection of the base member has at least one recess in the outer circumferential face, which recess interacts with a corresponding radial projection on the inner circumferential face of the first bearing sleeve for locking against rotation.

11. The belt tensioning device of claim 1, wherein the bearing sleeve comprises a plurality of slots distributed along the circumference and extending in an axial direction.

12. The belt tensioning device of claim 1, wherein the bearing sleeve is a plastics component made from polyamide.

13. The belt tensioning device of claim 1, wherein the spring arrangement comprises at least one bow-shaped spring that has a circumferential extension of less than 360° around the first and the second pivot axis.

14. The belt tensioning device of claim 13, wherein the base member has an opening formed such that at least one of a drive shaft and a drive belt pulley of an auxiliary unit can extend into the opening without contact.

* * * * *